United States Patent [19]
Reinders

[11] Patent Number: 5,888,342
[45] Date of Patent: Mar. 30, 1999

[54] DEVICE FOR INTRODUCING A FOIL STRIP INTO THE PINCH BETWEEN TWO ROLLERS

[75] Inventor: Johannes Antonius Maria Reinders, Warnsveld, Netherlands

[73] Assignee: Sallmetall B.V., Raalte, Netherlands

[21] Appl. No.: 892,927

[22] Filed: Jul. 15, 1997

[30] Foreign Application Priority Data

Jul. 16, 1996 [NL] Netherlands ............................ 1003603

[51] Int. Cl.⁶ ................................................. B65H 23/00
[52] U.S. Cl. ............................ 156/494; 156/555; 156/582
[58] Field of Search ................................. 156/555, 583.1, 156/160, 163, 164, 229, 289, 324, 494, 582

[56] References Cited

U.S. PATENT DOCUMENTS

| | | | |
|---|---|---|---|
| 3,461,519 | 8/1969 | Raschle | 28/62 |
| 4,064,299 | 12/1977 | Martin | 428/102 |
| 4,268,345 | 5/1981 | Semchuck | 156/499 |
| 4,353,776 | 10/1982 | Giulie et al. | 156/555 |

FOREIGN PATENT DOCUMENTS

| | | |
|---|---|---|
| 1525466 | 5/1967 | France . |
| 1600661 | 9/1970 | France . |
| 2356317 | 5/1975 | Germany . |
| 9302291 | 7/1995 | Netherlands . |
| 9500430 | 1/1995 | WIPO . |
| 9518056 | 7/1995 | WIPO . |

OTHER PUBLICATIONS

Patent Abstracts of Japan, EPO Publication No. 08025552 publication date Jan. 30, 1996 (1 page).

*Primary Examiner*—James Sells
*Attorney, Agent, or Firm*—Webb Ziesenheim Bruening Logsdon Orkin & Hanson, P.C.

[57] ABSTRACT

A device is provided for introducing a foil strip coming from a stock roll into the pinch between two rollers, for instance simultaneously with a plate or other flat object onto which the foil must be arranged by means of an adhesive layer. The device includes a braking member placed between the stock roll and a roller to exert a braking force on the foil strip, which braking member includes a fixedly disposed braking surface, which braking surface has a coating of PTFE (polytetrafluoroethylene), a silicone material or other smooth and adhesion-rejecting material.

20 Claims, 3 Drawing Sheets

DEVICE FOR INTRODUCING A FOIL STRIP INTO THE PINCH BETWEEN TWO ROLLERS

BACKGROUND OF THE INVENTION

The invention relates to a device for introducing a foil strip coming from a stock roll into the pinch between two rollers, for instance simultaneously with a plate or other flat object onto which the foil is to be arranged by means of an adhesive layer.

An object of the invention is to introduce the foil such that a well defined travel of the foil strip through the device is ensured. Such a well defined travel may for instance not, or only to a negligible extent, depend on the friction which the stock roll undergoes during rotation and on the temperature.

SUMMARY OF THE INVENTION

The device according to the invention is characterized by braking means placed between the stock roll and a roller to exert a braking force on the foil strip, which braking means comprise a fixedly disposed braking surface, which braking surface has a coating of PTFE (polytetrafluoroethylene), a silicone material or other smooth and adhesion-rejecting material. The braking surface can have a desired shape, for instance a desired curved or flat shape. In the case of a flat shape it is recommended that both the input edge and the output edge have a curved, fluent form. It will be apparent that bending of the foil preferably remains limited.

The coating is smooth. This is understood to mean that the material has a low coefficient of friction in common with the foil strip. Of equally great importance is the fact that the material is of a type which rejects adhesion with other materials. This aspect of the invention is particularly, though not exclusively, important in an embodiment wherein the strip is provided with a heat-activated glue layer which comes into direct contact with the braking surface.

A preferred embodiment has the special feature that the braking surface has a length which is not dependent on the quantity of foil present on the stock roll.

In a specific embodiment this device has the feature that between the stock roll and the braking surface is arranged a guide roller which determines the tangent plane along which the foil strip reaches the braking surface. The fixedly disposed braking surface can for instance be the outer surface of a fixedly disposed cylinder. Due to the presence of the free-rotating roller, which determines the input tangent plane, and the fixed position of the output tangent plane, the angle at which the foil strip lies against the fixed cylinder is known with this embodiment. This angle determines the braking force exerted on the foil strip. The braking force has hereby become very well controllable.

It may be desirable in some conditions to be able to adjust the braking force. To this end the above described embodiment can have the feature that the position of the guide roller is adjustable.

In a specific embodiment the device has the special feature that the braking means are adapted to heat the foil strip and that at least the associated roller is heated.

This embodiment can advantageously have the special feature that the braking means are heated by the associated roller.

A specific embodiment has the characteristic that the foil is of the type with a glue layer present on an outer surface, in particular a glue layer which can be heat-activated, and that the arrangement is such that the foil can be in contact with the braking means via the glue layer.

A particular embodiment has the feature that the braking surface comprises a curved input edge, a curved output edge and a middle part connecting fluently to both these edges. When there is variation in the position of the input tangent plane of the foil strip as a result of variations in the amount of foil present on the stock roll, the angle at which the foil strip lies against the curved input edge will vary. The change caused hereby in the effective braking force exerted on the foil strip will be very small relative to the braking action of the middle part and the output edge, and will even be negligible in practice.

A particular embodiment has the special feature that the middle part is flat.

BRIEF DESCRIPTION OF THE DRAWINGS

The invention will now be elucidated with reference to the annexed drawings. Herein.

DESCRIPTION OF THE PREFERRED EMBODIMENTS

Figure 1:
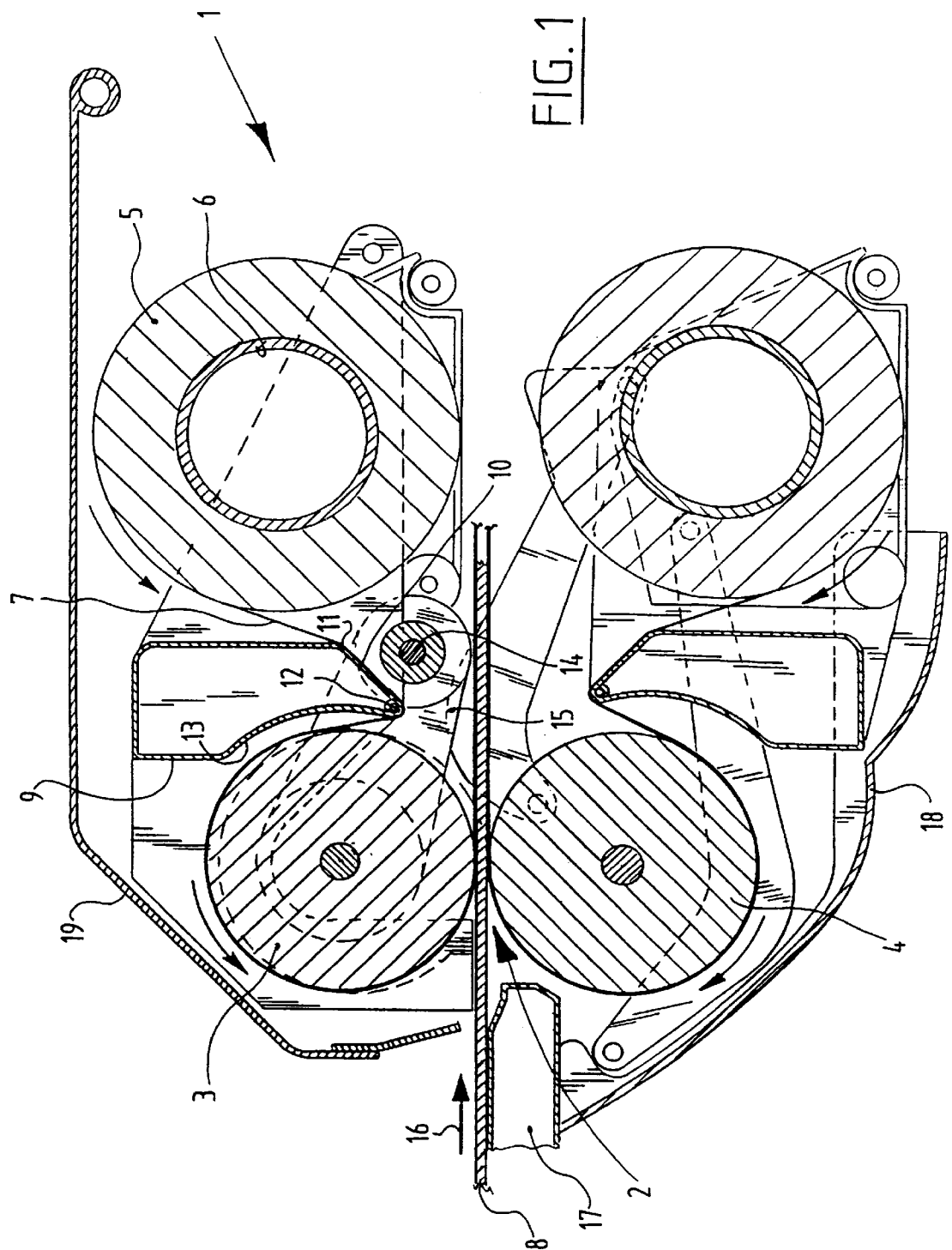
FIG. 1 shows a cross section through a device according to the invention.
Figure 2:
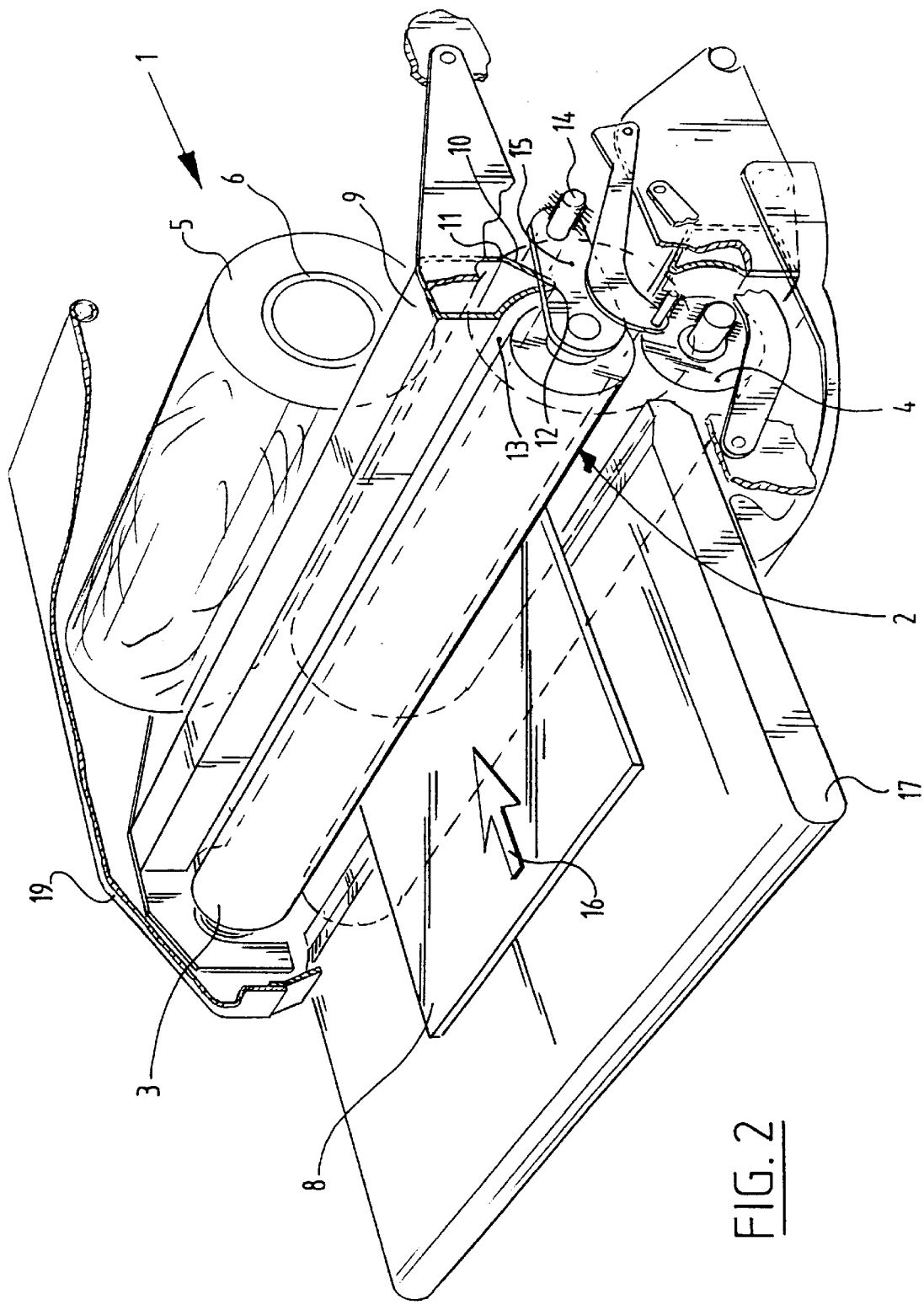
FIG. 2 shows a perspective view of the device according to FIG. 1.

FIGS. 1 and 2 show a device 1 for introducing into the pinch 2 between two heated rollers 3, 4 pressed toward each other of a foil strip 7 coming from a stock roll 5 with a hollow core 6, this simultaneously with a plate 8 onto which foil 7 must be applied.

Foil 7 is provided with a glue layer on its outer side in the situation wound onto stock roll 5 In this embodiment this glue layer is of the heat-activated type. In order to activate the glue the foil strip 7 is trained round a largest possible part of the periphery of roller 7. In this embodiment the foil 7 lies at an angle of about 270° against roller 3. Not drawn are drive means for driving the rollers 3, 4.

A hollow metal box guide 9 is arranged between roller 3 and stock roll 5. Foil strip 7 is guided in the manner shown round box guide 9. This latter has on its underside a flat surface 10 with a rounded input surface 11 connecting fluently thereto and a rounded output surface 12 connecting fluently thereto. The radii of curvature of Surfaces 11, 12 are large such that the foil can withstand these deflecting operations. Of importance is that the foil lies against the flat braking surface 10. Because the extension of this surface 10 intersects the cylindrical peripheral surface of the hollow core 6, the length over which foil strip 7 extends is substantially independent of the quantity of foil 7 present on stock roll 5.

Box guide 9 further has a curved surface 13 corresponding with the form of the roller 3. This surface 13 absorbs an amount of heat from the heated roller 3 such that through heat conduction a certain temperature rise also occurs at the location of flat surface 10 and surfaces 11 and 12, whereby foil 7 already undergoes a certain pre-heating at these positions.

In per se known manner the roller 3 is vertically movable round a swivel centre line 14 by means of a supporting frame 15. Plates 8 of different thicknesses can thus be fed through the device 1 in the direction of arrow 16. Not drawn are means which fix the pressure force at a desired value.

It is important that at the position of the pinch 2 the foil is placed smoothly and tautly round the roller. This enhances quality, in particular the smoothness and the absence of air inclusions after adhesion of the foil with its adhesive layer to the plate 8. The device according to the invention ensures this well defined and controlled travel of the foil.

The rollers 3, 4 can for instance be heated to a temperature in the order of 120° C. It will be apparent that this temperature is subject to the nature of the applied materials, particularly the temperature resistance of foil 7 and the temperature to which the adhesive layer must be heated.

The braking force obtained does not depend on the width of the foil.

Attention is drawn to the fact that only the upper part of the device 1 is described. The lower part has the same basic structure and will therefore not be described.

The insertion of the plate material 8 takes place by pushing in the input direction 16 over an input table 17. The device further has a housing 18 with a fold-up cover 19.

Figure 3:
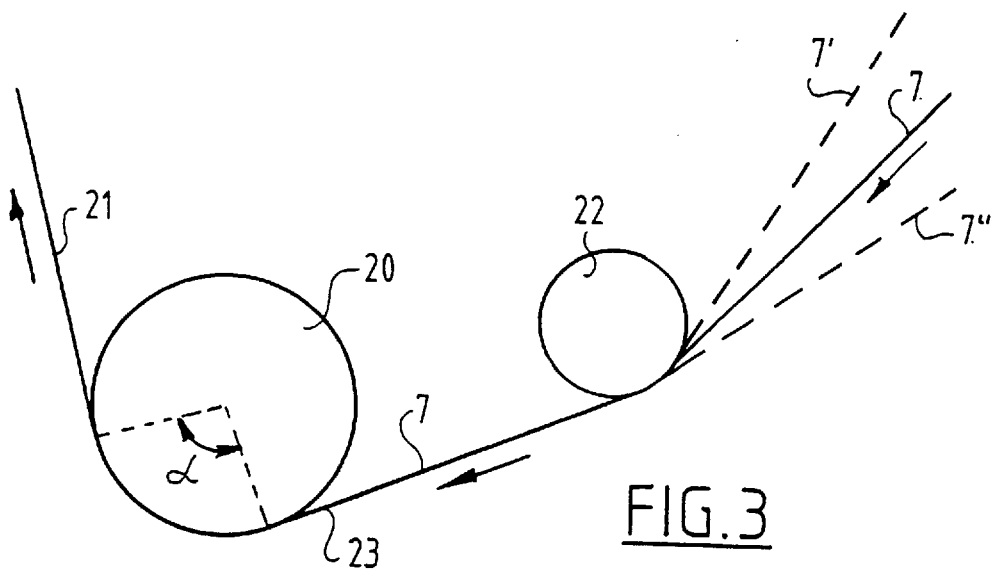
FIG. 3 shows a schematic side view of a second embodiment.

FIG. 3 shows a fixedly and non-movably disposed braking cylinder 20 over which foil strip 7 is carried. As will be apparent with reference to FIG. 1, the output tangent plane 21 of foil strip 7 is constant Foil strip 7 is fed from stock roll 5 to braking cylinder 20 via a fixedly disposed, free-rotating guide roller 22. As a result of this arrangement the input tangent plane 23 of foil strip 7 relative to braking cylinder 20 is constant. The tangent planes 21 and 23 define the angle $\alpha$ at which foil strip 7 lies against the outer surface of braking cylinder 20. It will be further apparent from FIG. 3 that the input angle of the foil strip relative to guide roller 22 can vary between the position designated with 7', which corresponds with a substantially full stock roll 5, an, the position designated with 7", wherein stock roll 5 is almost empty. As will be apparent with reference to the foregoing, this does not influence the friction force exerted on foil strip 7 determined by the angle $\alpha$ and the properties of braking cylinder 20.

Figure 4:
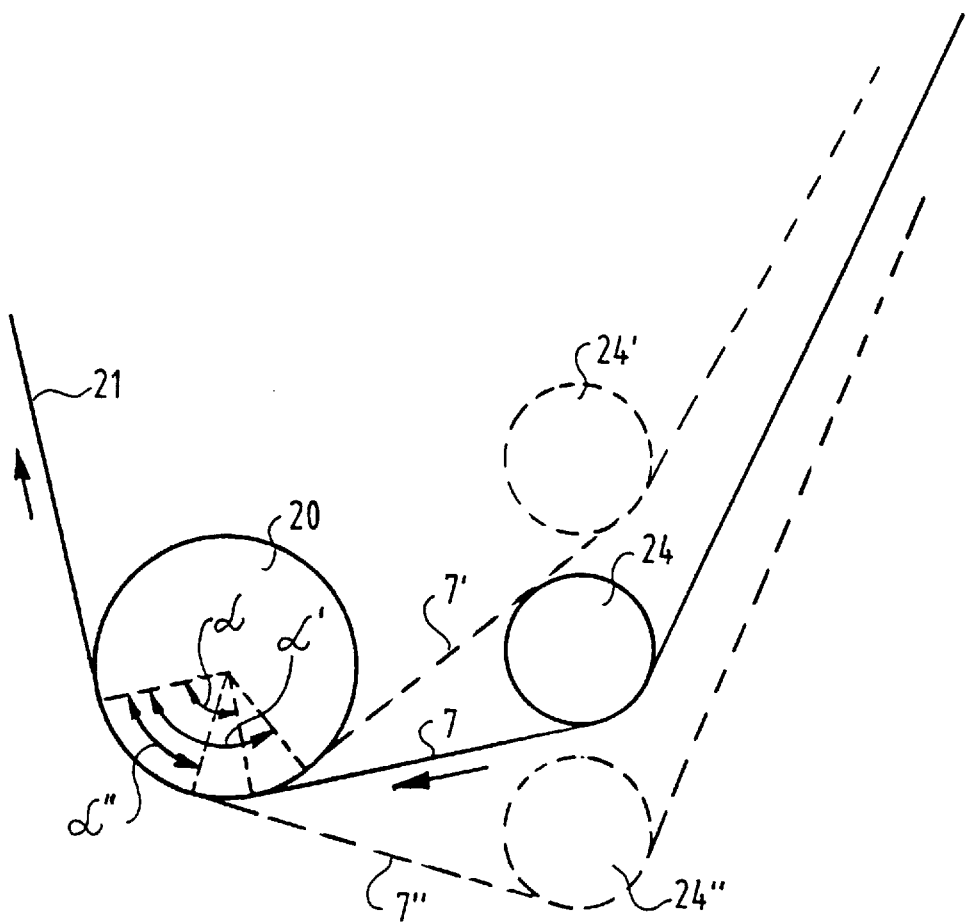
FIG. 4 shows a view corresponding with FIG. 3 of a third embodiment.

FIG. 4 shows that a free-rotating guide roller 24 has a variable position. In the intermediate position drawn in full lines and corresponding with the situation of FIG. 3, foil strip 7 lies at the angle $\alpha$ against the braking cylinder 20. In a second position, wherein the guide roller is desigated 24', foil strip 7' lies at an angle $\alpha'$, while in the position of the guide roller designated 24", the relevant angle has the value $\alpha"$. Not shown in FIG. 4 is hat in each of the said positions of guide roller 24 the, input angle of foil strip 7 relative to guide roller 24 may vary as according to FIG. 3 without this influencing the braking force exerted by braking cylinder 20 on foil strip 7. This is in any case wholly determined by the angle at which the foil strip lies against the braking cylinder 20.

I claim:

1. A device for introducing a foil strip from a stock roll into a pinch between two rollers, the device comprising:

braking means located between the stock roll and a roller and configured to exert a braking force on the foil strip, the braking means including a fixedly disposed braking surface having a coating of a smooth and adhesion-rejecting material, and wherein the foil strip includes a glue layer and the foil strip is in contact with the braking means via the glue layer.

2. The device as claimed in claim 1, wherein the braking surface has a length which is independent of a quantity of foil present on the stock roll.

3. The device as claimed in claim 2, including a guide roller located between the stock roll and the braking surface, the guide roller determining a tangent plane along which the foil strip contacts the braking surface.

4. The device as claimed in claim 3, wherein a position of the guide roller is adjustable.

5. The device as claimed in claim 1, wherein at least one of the two rollers is heated such that the braking means is heated by at least one heated roller, and the foil strip is heated by the braking means.

6. The device as claimed in claim 5, wherein the braking means is heated by the at least one heated roller.

7. The device as claimed in claim 1, wherein the braking surface comprises a curved input edge, a curved output edge and a middle part extending therebetween.

8. The device as claimed in claim 7, wherein the middle part is flat.

9. The device as claimed in claim 1, wherein the adhesion-rejecting material includes a material selected from the group consisting of polytetrafluoroethylene and silicone.

10. The device as claimed in claim 2, wherein at least one of the two rollers is heated such that the braking means is heated by at least one heated roller, and the foil strip is heated by the braking means.

11. The device as claimed in claim 3, wherein at least one of the two rollers is heated such that the braking means is heated by at least one heated roller, and the foil strip is heated by the braking means.

12. The device as claimed in claim 4, wherein at least one of the two rollers is heated such that the braking means is heated by at least one heated roller, and the foil strip is heated by the braking means.

13. The device as claimed in claim 2, wherein the braking surface comprises a curved input edge, a curved output edge and a middle part herebetween.

14. The device as claimed in claim 2, wherein the braking surface comprises a curved input edge, a curved output edge and a middle part fluently therebetween.

15. The device as claimed in claim 4, wherein the braking surface comprises a curved input edge, a curved output edge and a middle part extending therebetween.

16. The device as claimed in claim 5, wherein the braking surface comprises a curved input edge, a curved output edge and a middle part extending therebetween.

17. The device as claimed in claim 6, wherein the braking surface comprises a curved input edge, a curved output edge and a middle part extending therebetween.

18. The device as claimed in claim 13, wherein the middle part is flat.

19. The device as claimed in claim 14, wherein the middle part is flat.

20. The device as claimed in claim 1, wherein the glue layer is heat-activated.

* * * * *

UNITED STATES PATENT AND TRADEMARK OFFICE
CERTIFICATE OF CORRECTION

PATENT NO. : 5,888,342
DATED : March 30, 1999
INVENTOR(S) : Johannes Antonius Maria Reinders It is certified that error appears in the above-identified patent and that said Letters Patent is hereby corrected as shown below:

Column 2 Line 37 after "stock roll 5" insert period --.--.

Column 2 Line 48 "of Surfaces" should read --of surfaces--.

Column 3 Line 24 after "constant" insert period --.--.

Column 3 Line 33 "an," should read --and--.

Column 3 Line 46 "is hat" should read --is that--.

Column 3 Line 47 between "the" and "input" delete comma --,--.

Column 4 Line 40 Claim 13 after "middle part" delete "herebetween" and insert --extending therebetween--.

Column 4 Line 41 Claim 14 "in claim 2" should read --in claim 3--.

Column 4 Line 43 Claim 14 delete "fluently" and insert --extending--.

Signed and Sealed this

Twelfth Day of October, 1999

Attest:

Q. TODD DICKINSON

*Attesting Officer*   *Acting Commissioner of Patents and Trademarks*